United States Patent
Andoni et al.

(10) Patent No.: US 9,785,886 B1
(45) Date of Patent: Oct. 10, 2017

(54) COOPERATIVE EXECUTION OF A GENETIC ALGORITHM WITH AN EFFICIENT TRAINING ALGORITHM FOR DATA-DRIVEN MODEL CREATION

(71) Applicant: SparkCognition, Inc., Austin, TX (US)

(72) Inventors: Sari Andoni, Austin, TX (US); Keith D. Moore, Cedar Park, TX (US); Syed Mohammad Amir Husain, Georgetown, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 15/489,564

(22) Filed: Apr. 17, 2017

(51) Int. Cl.
*G06F 15/18* (2006.01)
*G06N 3/00* (2006.01)
*G06N 3/12* (2006.01)
*G06N 3/08* (2006.01)
*G06F 17/30* (2006.01)
*G06N 3/04* (2006.01)

(52) U.S. Cl.
CPC ....... *G06N 3/086* (2013.01); *G06F 17/30312* (2013.01); *G06F 17/30424* (2013.01); *G06N 3/04* (2013.01)

(58) Field of Classification Search
USPC .......................................................... 706/13
See application file for complete search history.

(56) References Cited

U.S. PATENT DOCUMENTS

| | | | | |
|---|---|---|---|---|
| 6,058,209 A * | 5/2000 | Vaidyanathan | .... | G06K 9/00127 382/133 |
| 7,092,857 B1 * | 8/2006 | Steiner | ................. | G06N 3/0427 703/2 |
| 7,398,260 B2 * | 7/2008 | Fiske | ................ | G06F 15/17343 706/13 |
| 8,019,705 B2 * | 9/2011 | Fiske | .................... | B82Y 10/00 706/10 |
| 8,150,677 B2 * | 4/2012 | Menezes | ............. | G06F 17/2827 704/2 |
| 8,229,734 B2 * | 7/2012 | Bennett | ................... | G06F 17/27 704/9 |

(Continued)

OTHER PUBLICATIONS

An Improved Polynomial Neural Network Classifier Using Real-Coded Genetic Algorithm Chin-Teng Lin; Mukesh Prasad; Amit Saxena IEEE Transactions on Systems, Man, and Cybernetics: Systems Year: 2015, vol. 45, Issue: 11 pp. 1389-1401, DOI: 10.1109/TSMC.2015.2406855 IEEE Journals & Magazines.*

(Continued)

*Primary Examiner* — Michael B Holmes
(74) *Attorney, Agent, or Firm* — Toler Law Group, PC

(57) ABSTRACT

A method includes, based on a fitness function, selecting a subset of models from a plurality of models. The plurality of models is generated based on a genetic algorithm and corresponds to a first epoch of the genetic algorithm. Each of the plurality of models includes data representative of a neural network. The method also includes performing at least one genetic operation of the genetic algorithm with respect to at least one model of the subset to generate a trainable model and sending the trainable model to an optimization trainer. The method includes adding a trained model received from the optimization trainer as input to a second epoch of the genetic algorithm that is subsequent to the first epoch.

20 Claims, 9 Drawing Sheets

(56) References Cited

U.S. PATENT DOCUMENTS

| | | | | |
|---|---|---|---|---|
| 8,233,471 | B2* | 7/2012 | Brownrigg | H04L 29/06 370/351 |
| 8,256,381 | B2* | 9/2012 | Pratt | A01K 29/00 119/174 |
| 8,282,557 | B2* | 10/2012 | Haynes | A61B 8/08 119/174 |
| 8,311,144 | B1* | 11/2012 | Sun | H04L 25/03343 375/267 |
| 8,505,488 | B2* | 8/2013 | Pratt | A01K 29/00 119/174 |
| 8,594,222 | B1* | 11/2013 | Sun | H04L 25/03343 375/267 |
| 8,625,496 | B2* | 1/2014 | Brownrigg | H04L 29/06 370/328 |
| 8,712,942 | B2* | 4/2014 | Fiske | G06F 15/163 706/14 |
| 8,787,246 | B2* | 7/2014 | Brownrigg | H04B 7/18584 370/316 |
| 8,881,984 | B2* | 11/2014 | Santos | G06K 7/146 235/462.09 |
| 8,929,971 | B2* | 1/2015 | Haynes | A61B 8/08 119/174 |
| 8,982,856 | B2* | 3/2015 | Brownrigg | H04B 7/18584 370/338 |
| 9,292,675 | B2* | 3/2016 | Husain | G06F 21/316 |
| 9,578,053 | B2* | 2/2017 | Husain | H04L 63/1441 |

OTHER PUBLICATIONS

Character Recogntion System: Performance Comparison of Neural Networks and Genetic Algorithm Md. Shahazan Ali; Md. Nazrul Islam Mondal 2015 International Conference on Computer and Information Engineering (ICCIE) Year: 2015 pp. 91-94, DOI: 10.1109/CCIE.2015.7399325 IEEE Conference Publications.*

Simulation research based on a self-adaptive genetic algorithm Jiang Jing; Meng Li-dong; Li Shu-ling; Jiang Lin 2010 IEEE International Conference on Intelligent Computing and Intelligent Systems Year: 2010, vol. 3 pp. 267-269, DOI: 10.1109/ICICISYS. 2010.5658541 IEEE Conference Publications.*

An Improved Probabilistic Neural Network with GA Optimization Huafen Yang; You Yang 2012 Fifth International Conference on Intelligent Computation Technology and Automation Year: 2012 pp. 76-79, DOI: 10.1109/ICICTA.2012.26 IEEE Conference Publications.*

Neural network designs with genetic learning for control of a single link flexible manipulator Sandeep Jain; Pei-Yuan Peng; A. Tzes; F. Khorrami American Control Conference, 1994 Year: 1994, vol. 3 pp. 2570-2574 vol. 3, DOI: 10.1109/ACC.1994.735023 IEEE Conference Publications.*

New adaptive genetic algorithm based on ranking Zhiming Liu; Jiliu Zhou; Su Lai Proceedings of the 2003 International Conference on Machine Learning and Cybernetics (IEEE Cat. No. 03EX693) Year: 2003, vol. 3 pp. 1841-1844 vol. 3, DOI: 10.1109/ICMLC. 2003.1259796 IEEE Conference Publications.*

Theoretical analysis of evolutionary algorithms with an infinite population size in continuous space. Part I: Basic properties of selection and mutation Xiaofeng Qi; F. Palmieri IEEE Transactions on Neural Networks Year: 1994, vol. 5, Issue: 1 pp. 102-119, DOI: 10.1109/72.265965 IEEE Journals & Magazines.*

"Backpropagation vs. Genetic Algorithm for Neural Network Training," <http://stats.stackexchange.com/questions/55887/backpropagation-vs-genetic-algorithm-for-neural-network-training> printed Mar. 23, 2017, 2pgs.

"Evolution Strategies as a Scalable Alternative to Reinforcement Learning," <https://blog.openai.com/evolution-strategies/> Mar. 24, 2017, 2 pgs.

Fiszelew, A. et al., "Automatic Generation of Neural Networks based on Genetic Algorithms," 2003, 7 pgs.

Floreano, Dario et al., "Neuroevolution: from architectures to learning," Review Article, 2008, Evol. Intel. Springer-Verlag, pp. 47-62.

Morse, Gregory et al., "Simple Evolutionary Optimization Can Rival Stochastic Gradient Descent in Neural Networks," GECCO '16, Proceedings of the Genetic and Evolutionary Computation Conference 2016, 8 pgs.

Pan, Zhengjun et al., "Evolving Both the Topology and Weights of Neural Networks," Parallel Algorithms and Applications, 1996, vol. 9, 7 pgs.

Parker, Matt et al., "Lamarckian Neuroevolution for Visual Control in the Quake II Environment," Proceedings of the 2009 IEEE Congress on Evolutionary Computation, 2009, IEEE, Piscataway, NJ, pp. 2630-2637.

Salimans, Tim et al., "Evolution Strategies as a Scalable Alternative to Reinforcement Learning," Cornell University Library, Mar. 10, 2017, arXiv:1703.03864 [stat. ML], 12 pgs.

Wong G. et al., "Enhancing Competitive Island Cooperative Neuroevolution through Backpropagation for Pattern Classification," International Conference on Neural Information Processing, 2015, 10 pgs.

Zhang, M. et al., "Using Back Propagation Algorithm and Genetic Algorithms to Train and Refine Neural Networks for Object Detection," Database and Expert Systems Applications, DEXA 1999, Lecture Notes in Computer Science, vol. 1677, Springer, Berlin, Heidelberg, 12 pgs.

* cited by examiner

COOPERATIVE EXECUTION OF A GENETIC ALGORITHM WITH AN EFFICIENT TRAINING ALGORITHM FOR DATA-DRIVEN MODEL CREATION

BACKGROUND

Computers are often used to solve complex quantitative and qualitative problems. For problems that involve a large data set, a specially trained professional, known as a data scientist, is often hired. The data scientist interprets the data set and constructs models that can be processed by computers to solve the problem. However, hiring data scientists is cost prohibitive for many organizations.

For certain types of problems, advanced computing techniques, such as genetic algorithms or backpropagation, may be available to develop a model, such as a neural network, that is comparable in accuracy to a model that would be created by a data scientist. However, genetic algorithms may take a large number of iterations to converge on an acceptable neural network, and backpropagation may be slow when a large data set is being modeled or when the neural network includes a large number of nodes, connections, or layers.

Furthermore, various types of machine-learning problems exist. For example, regression problems involve evaluating a series of inputs to predict a numeric output, classification problems involve evaluating a series of inputs to predict a categorical output, and reinforcement learning involves performing actions within an environment to optimize some notion of a positive reward. Due to the differences in the various types of problems, the available mechanisms to generate and train a neural network or other machine learning solution may be problem-specific. For example, a support vector machine (SVM) may be suitable for some classification problems, logistic regression may be suitable for some regression problems, and a specialized machine learning package, such as TensorFlow, may be suitable for reinforcement learning. Thus, generating and training neural networks that meet performance requirements for each of multiple types of problems faced by an enterprise may be slow and difficult.

SUMMARY

The present application describes automated model building systems and methods that utilize a genetic algorithm and selective backpropagation to generate and train a neural network in a manner that is applicable to multiple types of machine-learning problems. To illustrate, the described automated model building techniques may enable a generalized approach to generating neural networks that can be applied for regression, classification, and reinforcement learning problems. Combining a genetic algorithm with selective backpropagation as described herein may enable generating a neural network that models a particular data set with acceptable accuracy and in less time than using genetic algorithms or backpropagation alone.

As an illustrative, non-limiting example, consider a home with four temperature sensors that periodically collect temperature readings in the living room (L), the dining room (D), the master bedroom (M), and the guest bedroom (G), respectively. In this example, a data set may include four columns, where each column corresponds to temperature readings from a particular sensor in a particular room, and where each row corresponds to a particular time at which the four sensors took a temperature reading. It may be of interest to predict the temperature in one of the rooms, e.g., L, given the temperature in the other three rooms, e.g., D, M, and G. A neural network may be suitable for such a problem, where the neural network has D, M, and/or G as input nodes and L as an output node. For example, a neural network that predicts an output value of L with 90% accuracy given input values of D, M, and/or G may be an acceptable solution.

In accordance with the described techniques, a combination of a genetic algorithm and an optimization algorithm such as backpropagation, a derivative free optimizer (DFO), an extreme learning machine (ELM) or similar optimizer may be used to generate and then train a neural network. It is to be understood that characterization of any system components of method steps as "optimizers" or "optimization trainers," and use of such terminology herein, is not to be interpreted as requiring such components or steps to generate optimal results to the extreme (e.g., 100% prediction or classification accuracy). Rather, user of such terms is to be interpreted as indicating an attempt generate an output that is improved in some fashion relative to an input. For example, an optimization trainer that receives a trainable model as input and outputs a trained model may attempt to improve a prediction or classification accuracy of the trainable model by modifying one or more attributes of the trainable model to generate the trained model. Genetic algorithms are iterative adaptive search heuristics inspired by biological natural selection. The genetic algorithm may start with a population of random models that each define a neural network with different topology, weights and activation functions. Over the course of several epochs (also known as generations), the models may be evolved using biology-inspired reproduction operations, such as crossover (e.g., combining characteristics of two neural networks), mutation (e.g., randomly modifying a characteristic of a neural network), stagnation/extinction (e.g., removing neural networks whose accuracy has not improved in several epochs), and selection (e.g., identifying the best performing neural networks via testing). In addition, the best performing models of an epoch may be selected for reproduction to generate a trainable model. The trainable model may be trained using backpropagation to generate a trained model. When the trained model is available, the trained model may be re-inserted into the genetic algorithm for continued evolution. Training a model that is generated by breeding the best performing population members of an epoch may serve to reinforce desired "genetic traits" (e.g., neural network topology, activation functions, connection weights, etc.), and introducing the trained model back into the genetic algorithm may lead the genetic algorithm to converge to an acceptably accurate solution (e.g., neural network) faster, for example because desired "genetic traits" are available for inheritance in later epochs of the genetic algorithm.

A computer system in accordance with the present disclosure may include a memory that stores an input data set and a plurality of data structures. For example, each data structure may be a model of a neural network that models the input data set. The computer system may also include at least one processor that is configured to execute a recursive search. For example, the recursive search may be a genetic algorithm to generate a neural network that best models the input data set. During a first iteration of the recursive search, the processor may determine a fitness value for each of the data structures (e.g., neural network models) based on at least a subset of the input data set. The processor may also select a subset of data structures based on their respective fitness values and may perform at least one of a crossover operation or a mutation operation with respect to at least one data structure of the subset to generate a trainable data structure. The processor may further provide the trainable data structure to an optimization trainer that is configured to train the trainable data structure based on a portion of the input data set to generate a trained structure and to provide the trained data structure as input to a second iteration of the recursive search that is subsequent to the first iteration.

DETAILED DESCRIPTION

Figure 1:
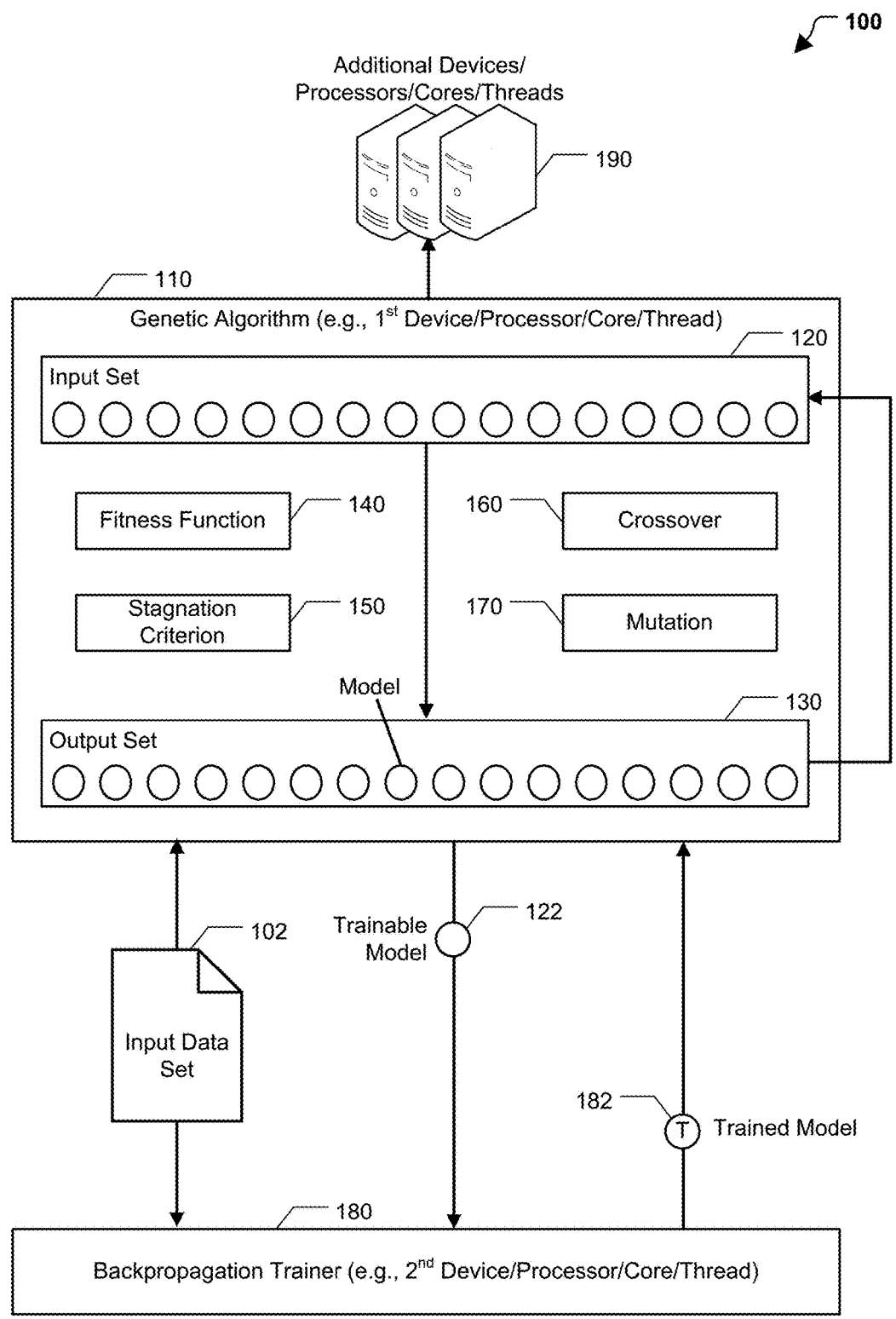
FIG. 1 illustrates a particular example of a system that is operable to support cooperative execution of a genetic algorithm and a backpropagation trainer.

Referring to FIG. 1, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110 and a backpropagation trainer 180. The backpropagation trainer 180 is an example of an optimization trainer, and other examples of optimization trainers that may be used in conjunction with the described techniques include, but are not limited to, a derivative free optimizer (DFO), an extreme learning machine (ELM), etc. In particular aspects, the genetic algorithm 110 is executed on a different device, processor (e.g., central processor unit (CPU), graphics processing unit (GPU) or other type of processor), processor core, and/or thread (e.g., hardware or software thread) than the backpropagation trainer 180. The genetic algorithm 110 and the backpropagation trainer 180 may cooperate to automatically generate a neural network model of a particular data set, such as an illustrative input data set 102. The system 100 may provide an automated model building process that enables even inexperienced users to quickly and easily build highly accurate models based on a specified data set. Additionally, the system 100 simplify the neural network model to avoid overfitting and to reduce computing resources required to run the model.

The genetic algorithm 110 includes or is otherwise associated with a fitness function 140, a stagnation criterion 150, a crossover operation 160, and a mutation operation 170. As described above, the genetic algorithm 110 may represent a recursive search process. Consequently, each iteration of the search process (also called an epoch or generation of the genetic algorithm) may have an input set (or population) 120 and an output set (or population) 130. The input set 120 of an initial epoch of the genetic algorithm 110 may be randomly or pseudo-randomly generated. After that, the output set 130 of one epoch may be the input set 120 of the next (non-initial) epoch, as further described herein.

The input set 120 and the output set 130 may each include a plurality of models, where each model includes data representative of a neural network. For example, each model may specify a neural network by at least a neural network topology, a series of activation functions, and connection weights. The topology of a neural network may include a configuration of nodes of the neural network and connections between such nodes. The models may also be specified to include other parameters, including but not limited to bias values/functions and aggregation functions.

Figure 2:
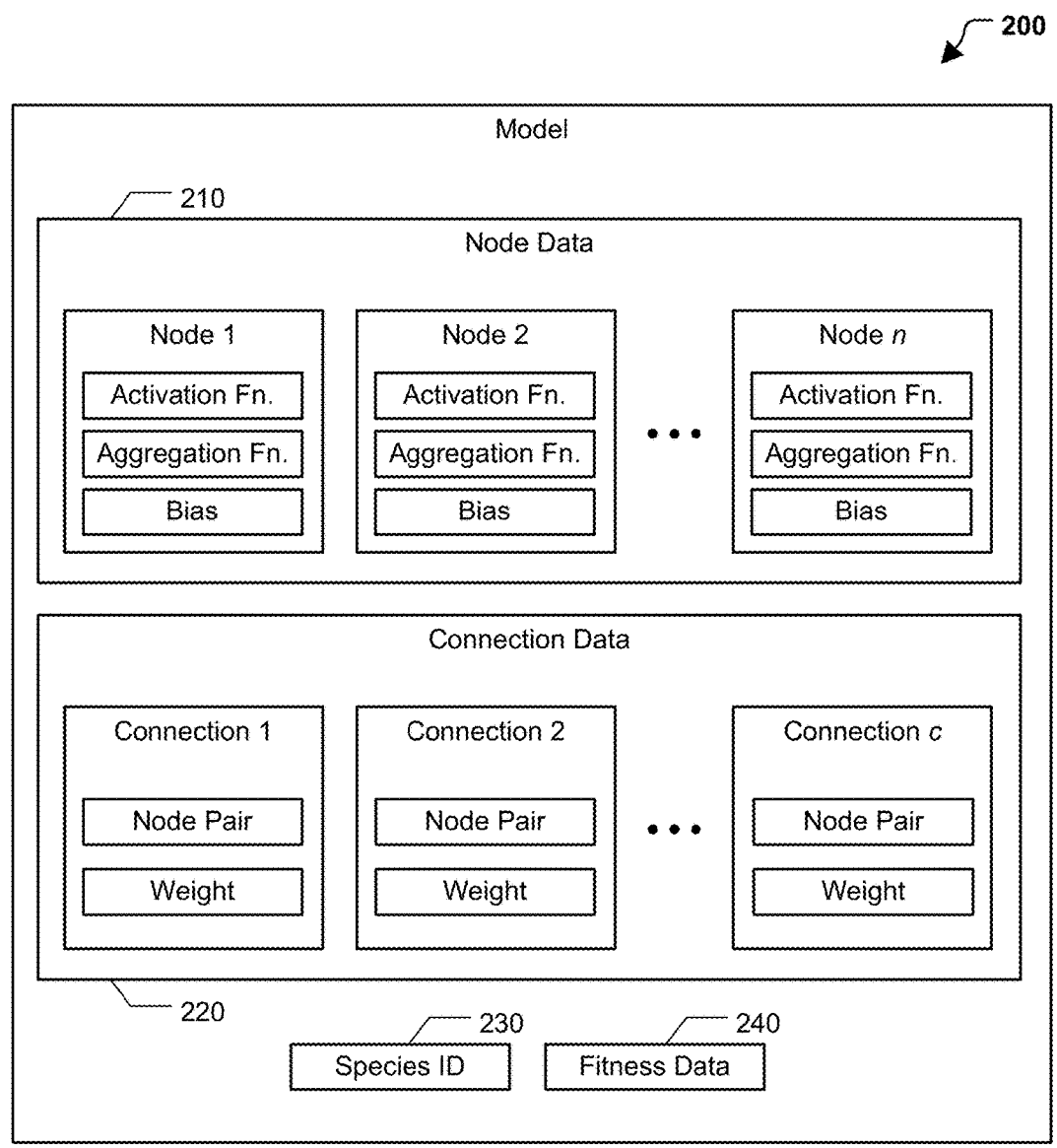
FIG. 2 illustrates a particular example of a model including data representative of a neural network.

Additional examples of neural network models are further described with reference to FIG. 2. In particular, as shown in FIG. 2, a model 200 may be a data structure that includes node data 210 and connection data 220. In the illustrated example, the node data 210 for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated.

The connection data 220 for each connection in a neural network may include at least one of a node pair or a connection weight. For example, if a neural network includes a connection from node N1 to node N2, then the connection data 220 for that connection may include the node pair <N1, N2>. The connection weight may be a numerical quantity that influences if and/or how the output of N1 is modified before being input at N2. In the example of a recurrent network, a node may have a connection to itself (e.g., the connection data 220 may include the node pair <N1, N1>).

The model 200 may also include a species identifier (ID) 230 and fitness data 240. The species ID 230 may indicate which of a plurality of species the model 200 is classified in, as further described with reference to FIG. 3. The fitness data 240 may indicate how well the model 200 models the input data set 102. For example, the fitness data 240 may include a fitness value that is determined based on evaluating the fitness function 140 with respect to the model 200, as further described herein.

Returning to FIG. 1, the fitness function 140 may be an objective function that can be used to compare the models of the input set 120. In some examples, the fitness function 140 is based on a frequency and/or magnitude of errors produced by testing a model on the input data set 102. As a simple example, assume the input data set 102 includes ten rows, that the input data set 102 includes two columns denoted A and B, and that the models illustrated in FIG. 1 represent neural networks that output a predicted a value of B given an input value of A. In this example, testing a model may include inputting each of the ten values of A from the input data set 102, comparing the predicted values of B to the corresponding actual values of B from the input data set 102, and determining if and/or by how much the two predicted and actual values of B differ. To illustrate, if a particular neural network correctly predicted the value of B for nine of the ten rows, then the a relatively simple fitness function 140 may assign the corresponding model a fitness value of 9/10=0.9. It is to be understood that the previous example is for illustration only and is not to be considered limiting. In some aspects, the fitness function 140 may be based on factors unrelated to error frequency or error rate, such as number of input nodes, node layers, hidden layers, connections, computational complexity, etc.

In a particular aspect, fitness evaluation of models may be performed in parallel. To illustrate, the system 100 may include additional devices, processors, cores, and/or threads 190 to those that execute the genetic algorithm 110 and the backpropagation trainer 180. These additional devices, processors, cores, and/or threads 190 may test model fitness in parallel based on the input data set 102 and may provide the resulting fitness values to the genetic algorithm 110.

In a particular aspect, the genetic algorithm 110 may be configured to perform speciation. For example, the genetic algorithm 110 may be configured to cluster the models of the input set 120 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 110 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 3.

Because the genetic algorithm 110 is configured to mimic biological evolution and principles of natural selection, it may be possible for a species of models to become "extinct." The stagnation criterion 150 may be used to determine when a species should become extinct, e.g., when the models in the species are to be removed from the genetic algorithm 110. Stagnation is further described with reference to FIG. 4.

The crossover operation 160 and the mutation operation 170 is highly stochastic under certain constraints and a defined set of probabilities optimized for model building, which produces reproduction operations that can be used to generate the output set 130, or at least a portion thereof, from the input set 120. In a particular aspect, the genetic algorithm 110 utilizes intra-species reproduction but not inter-species reproduction in generating the output set 130. Including intra-species reproduction and excluding inter-species reproduction may be based on the assumption that because they share more genetic traits, the models of a species are more likely to cooperate and will therefore more quickly converge on a sufficiently accurate neural network. In some examples, inter-species reproduction may be used in addition to or instead of intra-species reproduction to generate the output set 130. Crossover and mutation are further described with reference to FIG. 6.

Left alone and given time to execute enough epochs, the genetic algorithm 110 may be capable of generating a model (and by extension, a neural network) that meets desired accuracy requirements. However, because genetic algorithms utilize randomized selection, it may be overly time-consuming for a genetic algorithm to arrive at an acceptable neural network. In accordance with the present disclosure, to "help" the genetic algorithm 110 arrive at a solution faster, a model may occasionally be sent from the genetic algorithm 110 to the backpropagation trainer 180 for training. This model is referred to herein as a trainable model 122. In particular, the trainable model 122 may be based on crossing over and/or mutating the fittest models of the input set 120, as further described with reference to FIG. 5. Thus, the trainable model 122 may not merely be a genetically "trained" file produced by the genetic algorithm 110. Rather, the trainable model 122 may represent an advancement with respect to the fittest models of the input set 120.

The backpropagation trainer 180 may utilize a portion, but not all of the input data set 102 to train the connection weights of the trainable model 122, thereby generating a trained model 182. For example, the portion of the input data set 102 may be input into the trainable model 122, which may in turn generate output data. The input data set 102 and the output data may be used to determine an error value, and the error value may be used to modify connection weights of the model, such as by using gradient descent or another function.

The backpropagation trainer 180 may train using a portion rather than all of the input data set 102 to mitigate overfit concerns and/or to shorten training time. The backpropagation trainer 180 may leave aspects of the trainable model 122 other than connection weights (e.g., neural network topology, activation functions, etc.) unchanged. Backpropagating a portion of the input data set 102 through the trainable model 122 may serve to positively reinforce "genetic traits" of the fittest models in the input set 120 that were used to generate the trainable model 122. Because the backpropagation trainer 180 may be executed on a different device, processor, core, and/or thread than the genetic algorithm 110, the genetic algorithm 110 may continue executing additional epoch(s) while the connection weights of the trainable model 122 are being trained. When training is complete, the trained model 182 may be input back into (a subsequent epoch of) the genetic algorithm 110, so that the positively reinforced "genetic traits" of the trained model 182 are available to be inherited by other models in the genetic algorithm 110.

Operation of the system 100 is now described with reference to FIGS. 3-7. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 102 and may specify a particular data field or a set of data fields in the input data set 102 to be modeled. The data field(s) to be modeled may correspond to output nodes of a neural network that is to be generated by the system 100. For example, if a user indicates that the value of a particular data field is to be modeled (e.g., to predict the value based on other data of the data set), the model may be generated by the system 100 to include an output node that generates an output value corresponding to a modeled value of the particular data field. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed model topologies. To illustrate, the model may be constrained to include no more than a specified number of input nodes, no more than a specified number of hidden layers, or no recurrent loops.

Further, in particular implementations, the user can configure aspects of the genetic algorithm 110. For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130. As yet another example, the user can define a number of trainable models 122 to be trained by the backpropagation trainer 180 and fed back into the genetic algorithm 110 as trained models 182.

In particular aspects, configuration of the genetic algorithm 110 also includes performing pre-processing steps based on the input data set 102. For example, the system 100 may determine, based on the input data set 102 and/or user input, whether a neural network is to be generated for a regression problem, a classification problem, a reinforcement learning problem, etc. As another example, the input data set 102 may be "cleaned" to remove obvious errors, fill in data "blanks," etc. As another example, values in the input data set 102 may be scaled (e.g., to values between 0 and 1). As yet another example, non-numerical data (e.g., categorical classification data or Boolean data) may be converted into numerical data.

After the above-described configuration stage, the genetic algorithm 110 may automatically generate an initial set of models based on the input data set 102, received user input indicating (or usable to determine) the type of problem to be solved, etc. (e.g., the initial set of models is data-driven). As illustrated in FIG. 2, each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some examples, the input set 120 may have a specific number of models. For example, as shown in a first stage 300 of operation in FIG. 3, the input set may include 200 models. It is to be understood that alternative examples may include a different number of models in the input set 120 and/or the output set 130.

For the initial epoch of the genetic algorithm 110, the topologies of the models in the input set 120 may be randomly or pseudo-randomly generated within constraints specified by any previously input configuration settings. Accordingly, the input set 120 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model of epoch may have a second topology, including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 110 may automatically assign an activation function, an aggregation function, a bias, connection weights, etc. to each model of the input set 120 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 120 of the initial epoch. Thus, the models of the input set 120 of the initial epoch may have different topologies (which may include different input nodes corresponding to different input data fields if the data set includes many data fields) and different connection weights. Further, the models of the input set 120 of the initial epoch may include nodes having different activation functions, aggregation functions, and/or bias values/functions.

Continuing to a second stage 350 of operation, each model of the input set 120 may be tested based on the input data set 102 to determine model fitness. For example, the input data set 102 may be provided as input data to each model, which processes the input data set (according to the network topology, connection weights, activation function, etc., of the respective model) to generate output data. The output data of each model may be evaluated using the fitness function 140 to determine how well the model modeled the input data set 102. For example, in the case of a regression problem, the output data may be evaluated by comparing a prediction value in the output data to an actual value in the input data set 102. As another example, in the case of a classification problem, a classifier result indicated by the output data may be compared to a classification associated with the input data set 102 to determine if the classifier result matches the classification in the input data set 102. As yet another example, in the case of a reinforcement learning problem, a reward may be determined (e.g., calculated) based on evaluation of an environment, which may include one or more variables, functions, etc. In a reinforcement learning problem, the fitness function 140 may be the same as or may be based on the reward function(s). Fitness of a model may be evaluated based on performance (e.g., accuracy) of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields). In this illustrative example, the second model may be sparser (depending on the configuration of hidden nodes of each network model) and therefore may be assigned a higher fitness value that the first model.

Figure 3:
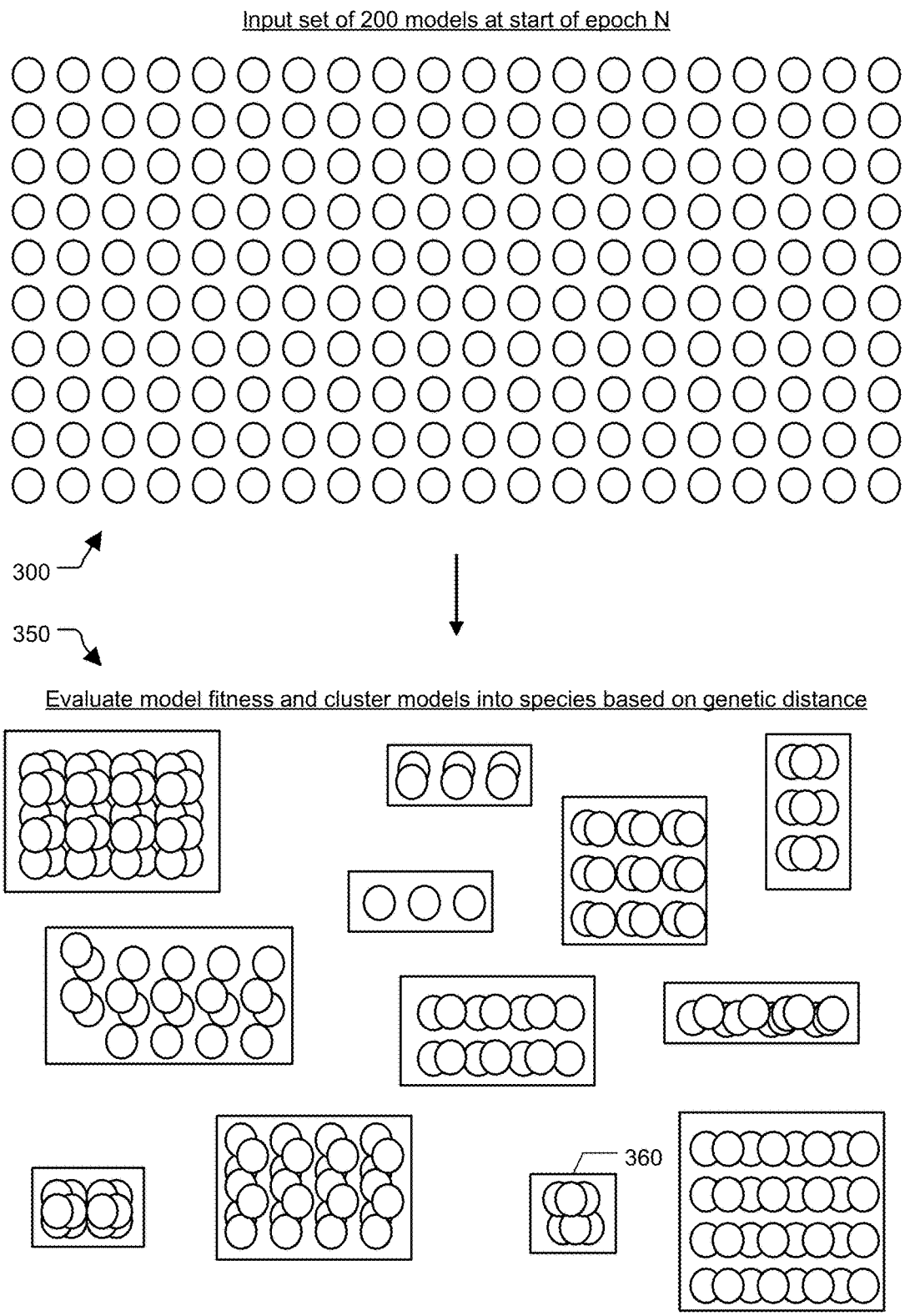
FIG. 3 illustrates particular examples of first and second stages of operation at the system of FIG. 1.

As shown in FIG. 3, the second stage 350 may include clustering the models into species based on genetic distance. In a particular aspect, the species ID 230 of each of the models may be set to a value corresponding to the species that the model has been clustered into.

Figure 4:
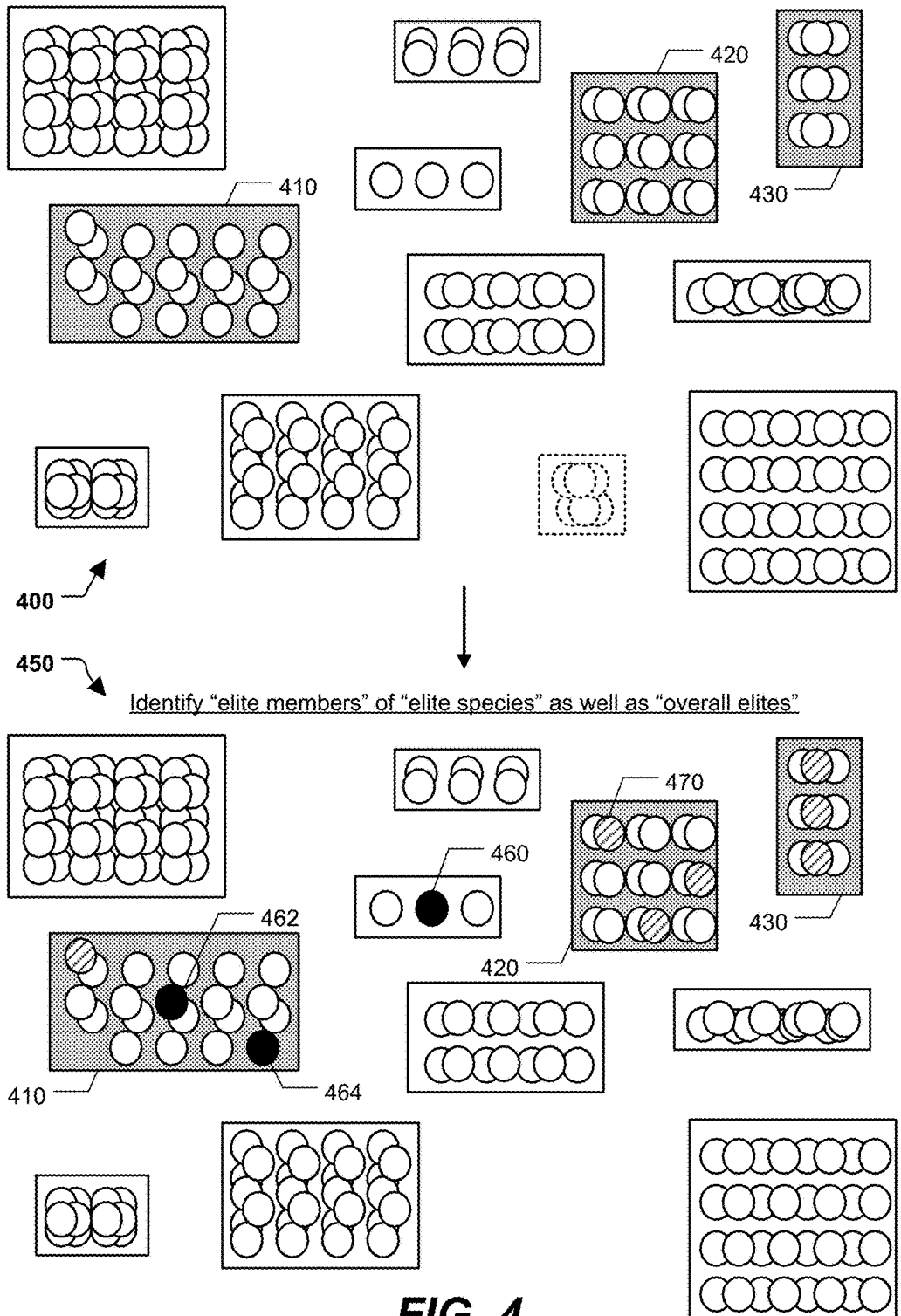
FIG. 4 illustrates particular examples of third and fourth stages of operation at the system of FIG. 1.

Continuing to FIG. 4, during a third stage 400 and a fourth stage 450 of operation, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 110 may maintain a data structure that tracks the fitness of each species across multiple epochs. Based on the species fitness, the genetic algorithm 110 may identify the "fittest" species, shaded and denoted in FIG. 4 as "elite species." Although three elite species 410, 420, and 430 are shown in FIG. 4, it is to be understood that in alternate examples a different number of elite species may be identified.

In a particular aspect, the genetic algorithm 110 uses species fitness to determine if a species has become stagnant and is therefore to become extinct. As an illustrative non-limiting example, the stagnation criterion 150 may indicate that a species has become stagnant if the fitness of that species remains within a particular range (e.g., +/−5%) for a particular number (e.g., 5) epochs. If a species satisfies a stagnation criteria, the species and all underlying models may be removed from the genetic algorithm 110. In the illustrated example, species 360 of FIG. 3 is removed, as shown in the third stage 400 through the use of broken lines.

Proceeding to the fourth stage 450, the fittest models of each "elite species" may be identified. The fittest models overall may also be identified. In the illustrated example, the three fittest models of each "elite species" are denoted "elite members" and shown using a hatch pattern. Thus, model 470 is an "elite member" of the "elite species" 420. The three fittest models overall are denoted "overall elites" and are shown using black circles. Thus, models 460, 462, and 464 are the "overall elites" in the illustrated example. As shown in FIG. 4 with respect to the model 460, an "overall elite" need not be an "elite member," e.g., may come from a non-elite species. In an alternate implementation, a different number of "elite members" per species and/or a different number of "overall elites" may be identified.

Figure 5:
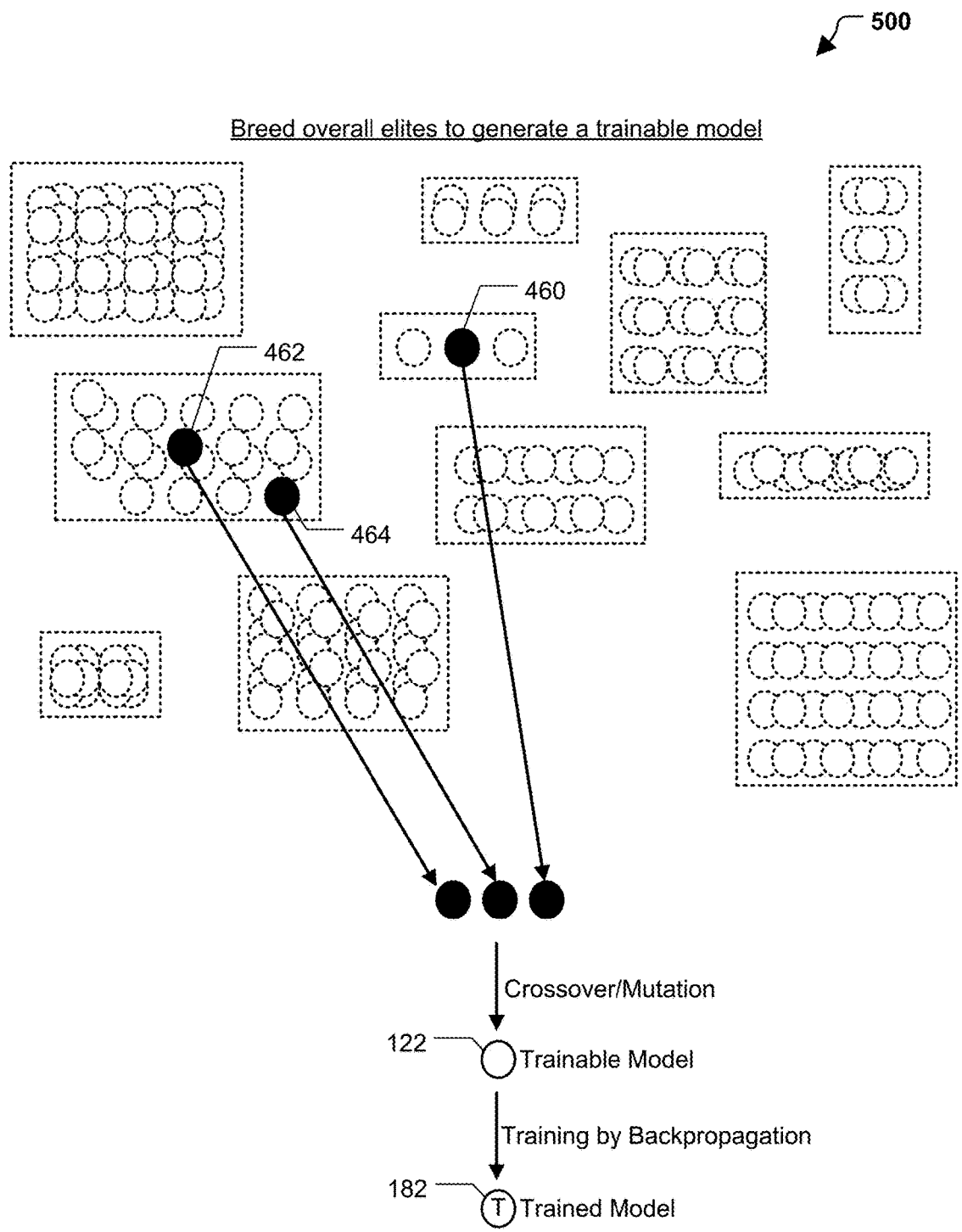
FIG. 5 illustrates a particular example of a fifth stage of operation at the system of FIG. 1.

Referring now to FIG. 5, during a fifth stage 500 of operation, the "overall elite" models 460, 462, and 464 may be genetically combined to generate the trainable model 122. For example, genetically combining models may include crossover operations in which a portion of one model is added to a portion of another model, as further illustrated in FIG. 6. As another example, a random mutation may be performed on a portion of one or more of the "overall elite" models 460, 462, 464 and/or the trainable model 122. The trainable model 122 may be sent to the backpropagation trainer 180, as described with reference to FIG. 1. The backpropagation trainer 180 may train connection weights of the trainable model 122 based on a portion of the input data set 102. When training is complete, the resulting trained model 182 may be received from the backpropagation trainer 180 and may be input into a subsequent epoch of the genetic algorithm 110.

Figure 6:
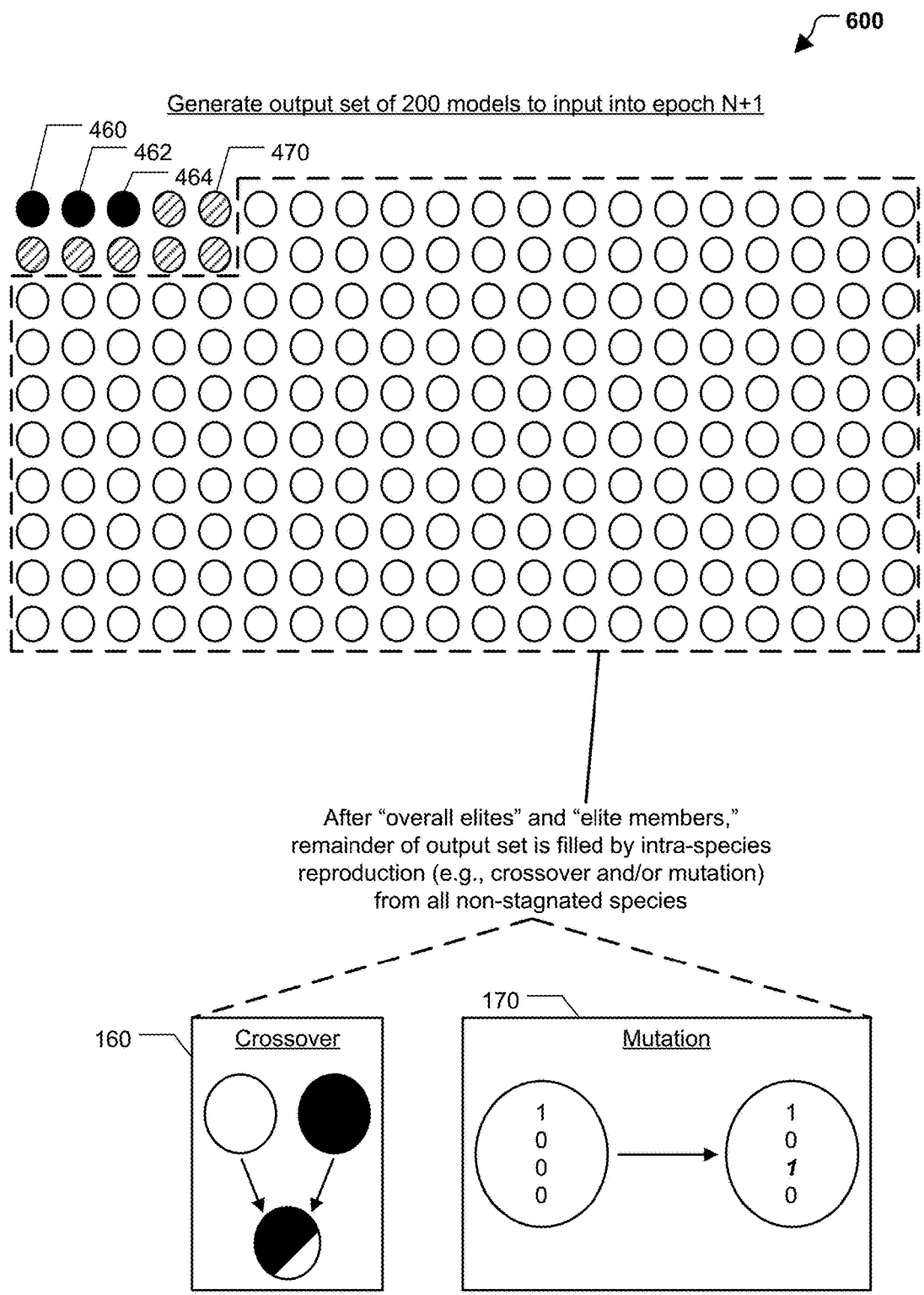
FIG. 6 illustrates a particular example of a sixth stage of operation at the system of FIG. 1.

Continuing to FIG. 6, while the backpropagation trainer 180 trains the trainable model, the output set 130 of the epoch may be generated in a sixth stage 600 of operation. In the illustrated example, the output set 130 includes the same number of models, e.g., 200 models, as the input set 120. The output set 130 may include each of the "overall elite" models 460-464. The output set 130 may also include each of the "elite member" models, including the model 470. Propagating the "overall elite" and "elite member" models to the next epoch may preserve the "genetic traits" resulted in caused such models being assigned high fitness values.

The rest of the output set 130 may be filled out by random intra-species reproduction using the crossover operation 160 and/or the mutation operation 170. In the illustrated example, the output set 130 includes 10 "overall elite" and "elite member" models, so the remaining 190 models may be randomly generated based on intra-species reproduction using the crossover operation 160 and/or the mutation operation 170. After the output set 130 is generated, the output set 130 may be provided as the input set 120 for the next epoch of the genetic algorithm 110.

During the crossover operation 160, a portion of one model may be combined with a portion of another model, where the size of the respective portions may or may not be equal. To illustrate with reference to the model "encodings" described with respect to FIG. 1, the crossover operation 160 may include concatenating bits 0 to p of one bit string with bits p+1 to q of another bit string, where p and q are integers and p+q is equal to the total size of a bit string that represents a model resulting from the crossover operation 160. When decoded, the resulting bit string after the crossover operation 160 produces a neural network that differs from each of its "parent" neural networks in terms of topology, activation function, aggregation function, bias value/function, link weight, or any combination thereof.

Thus, the crossover operation 160 may be a random or pseudo-random biological operator that generates a model of the output set 130 by combining aspects of a first model of the input set 120 with aspects of one or more other models of the input set 120. For example, the crossover operation 160 may retain a topology of hidden nodes of a first model of the input set 120 but connect input nodes of a second model of the input set to the hidden nodes. As another example, the crossover operation 160 may retain the topology of the first model of the input set 120 but use one or more activation functions of the second model of the input set 120. In some aspects, rather than operating on models of the input set 120, the crossover operation 160 may be performed on a model (or models) generated by mutation of one or more models of the input set 120. For example, the mutation operation 170 may be performed on a first model of the input set 120 to generate an intermediate model and the crossover operation 160 may be performed to combine aspects of the intermediate model with aspects of a second model of the input set 120 to generate a model of the output set 130.

During the mutation operation 170, a portion of a model may be randomly modified. The frequency of mutations may be based on a mutation probability metric, which may be user-defined or randomly selected/adjusted. To illustrate with reference to the model "encodings" described with respect to FIG. 1, the mutation operation 170 may include randomly "flipping" one or more bits a bit string.

The mutation operation 170 may thus be a random or pseudo-random biological operator that generates or contributes to a model of the output set 130 by mutating any aspect of a model of the input set 120. For example, the mutation operation 170 may cause the topology a particular model of the input set to be modified by addition or omission of one or more input nodes, by addition or omission of one or more connections, by addition or omission of one or more hidden nodes, or a combination thereof. As another example, the mutation operation 170 may cause one or more activation functions, aggregation functions, bias values/functions, and/or or connection weights to be modified. In some aspects, rather than operating on a model of the input set, the mutation operation 170 may be performed on a model generated by the crossover operation 160. For example, the crossover operation 160 may combine aspects of two models of the input set 120 to generate an intermediate model and the mutation operation 170 may be performed on the intermediate model to generate a model of the output set 130.

The genetic algorithm 110 may continue in the manner described above through multiple epochs. When the genetic algorithm 110 receives the trained model 182, the trained model 182 may be provided as part of the input set 120 of the next epoch, as shown in a seventh stage 700 of FIG. 7. For example, the trained model 182 may replace one of the other 200 models in the input set 120 or may be a $201^{st}$ model of the input set (e.g., in some epochs, more than 200 models may be processed). During training by the backpropagation trainer 180, the genetic algorithm 110 may have advanced one or more epochs. Thus, when the trained model 182 is received, the trained model 182 may be inserted as input into an epoch subsequent to the epoch during which the corresponding trainable model 122 was provided to the backpropagation trainer 180. To illustrate, if the trainable model 122 was provided to the backpropagation trainer 180 during epoch N, then the trained model 182 may be input into epoch N+X, where X is an integer greater than zero.

Figure 7:
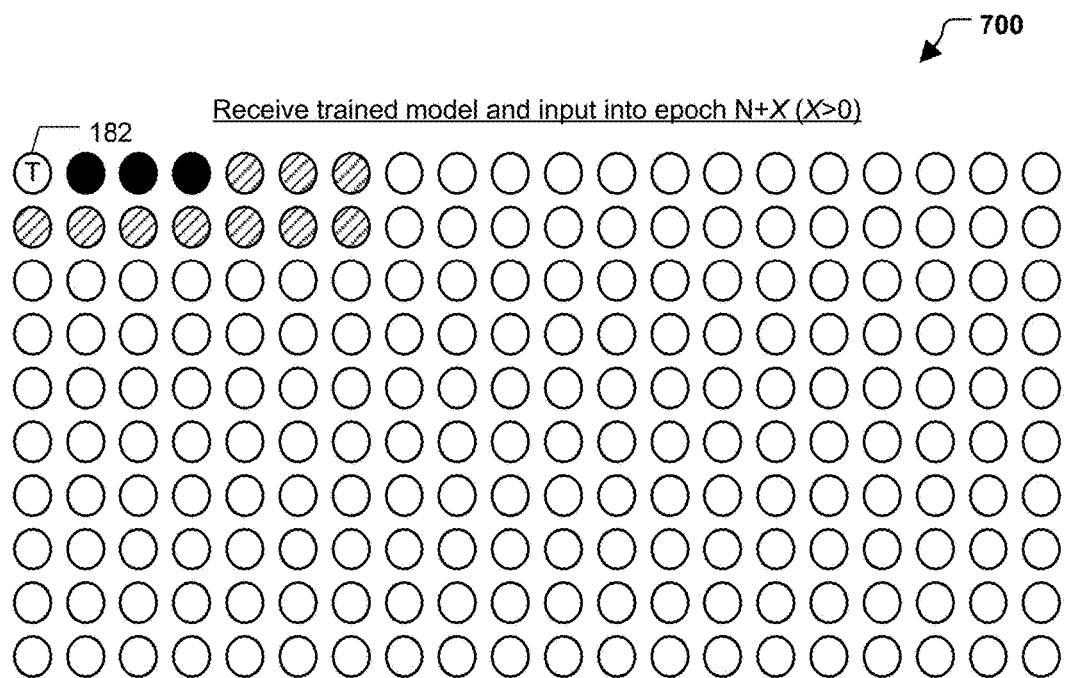
FIG. 7 illustrates a particular example of a seventh stage of operation at the system of FIG. 1.

In the example of FIGS. 5 and 7, a single trainable model 122 is provided to the backpropagation trainer 180 and a single trained model 182 is received from the backpropagation trainer 180. When the trained model 182 is received, the backpropagation trainer 180 becomes available to train another trainable model. Thus, because training takes more than one epoch, trained models 182 may be input into the genetic algorithm 110 sporadically rather than every epoch after the initial epoch. In some implementations, the backpropagation trainer 180 may have a queue or stack of trainable models 122 that are awaiting training. The genetic algorithm 110 may add trainable models 122 to the queue or stack as they are generated and the backpropagation trainer 180 may remove a training model 122 from the queue or stack at the start of a training cycle. In some implementations, the system 100 includes multiple backpropagation trainers 180 (e.g., executing on different devices, processors, cores, or threads). Each of the backpropagation trainers 180 may be configured to simultaneously train a different trainable model 122 to generate a different trained model 182. In such examples, more than one trainable model 122 may be generated during an epoch and/or more than one trained model 182 may be input into an epoch.

Operation at the system 100 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing a neural network that best models the input data set 102. In some examples, the overall fittest model may undergo a final training operation (e.g., by the backpropagation trainer 180) before being output.

Although various aspects are described with reference to a backpropagation training, it is to be understood that in alternate implementations different types of training may also be used in the system 100. For example, models may be trained using a genetic algorithm training process. In this example, genetic operations similar to those described above are performed while all aspects of a model, except for the connection weight, are held constant.

Performing genetic operations may be less resource intensive than evaluating fitness of models and training of models using backpropagation. For example, both evaluating the fitness of a model and training a model include providing the input data set 102, or at least a portion thereof, to the model, calculating results of nodes and connections of a neural network to generate output data, and comparing the output data to the input data set 102 to determine the presence and/or magnitude of an error. In contrast, genetic operations do not operate on the input data set 102, but rather merely modify characteristics of one or more models. However, as described above, one iteration of the genetic algorithm 110 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building highly accurate models based on a specified input data set 102.

The system 100 of FIG. 1 may thus support cooperative, data-driven execution of a genetic algorithm and a backpropagation trainer to automatically arrive at an output neural network model of an input data set. The system of FIG. 1 may arrive at the output neural network model faster than using a genetic algorithm or backpropagation alone and with reduced cost as compared to hiring a data scientist. In some cases, the neural network model output by the system 100 may also be more accurate than a model that would be generated by a genetic algorithm or backpropagation alone. The system 100 may also provide a problem-agnostic ability to generate neural networks. For example, the system 100 may represent a single automated model building framework that is capable of generating neural networks for at least regression problems, classification problems, and reinforcement learning problems. Further, the system 100 may enable generation of a generalized neural network that demonstrates improved adaptability to never-before-seen conditions. To illustrate, the neural network may mitigate or avoid overfitting to an input data set and instead may be more universal in nature. Thus, the neural networks generated by the system 100 may be capable of being deployed with fewer concerns about generating incorrect predictions.

It will be appreciated that the systems and methods of the present disclosure may be applicable in various scenarios, infrastructures, and data environments. As an illustrative non-limiting example, the input data set 102 may include timestamped data from a large array of sensors distributed around a wind farm and may also include timestamped uptime/downtime data of individual wind turbines. The system 100 may generate a neural network model that is configured how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 102 may include health data and the system 100 may automatically build a model to predict whether a patient exhibiting certain health conditions is likely to have a particular ailment. As another illustrative non-limiting example, the input data set 102 may include financial data and the system 100 may automatically build a model to forecast market conditions. As another illustrative non-limiting example, the input data set 102 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft autopilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system described herein is data fusion. In this case, data aggregated from a large number of sensors of various types, including multiple sensors of the same type, is collected and used to identify an object, action or phenomenon that wouldn't be entirely detectable with any one, or a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured, or low resolution).

Figure 8A:
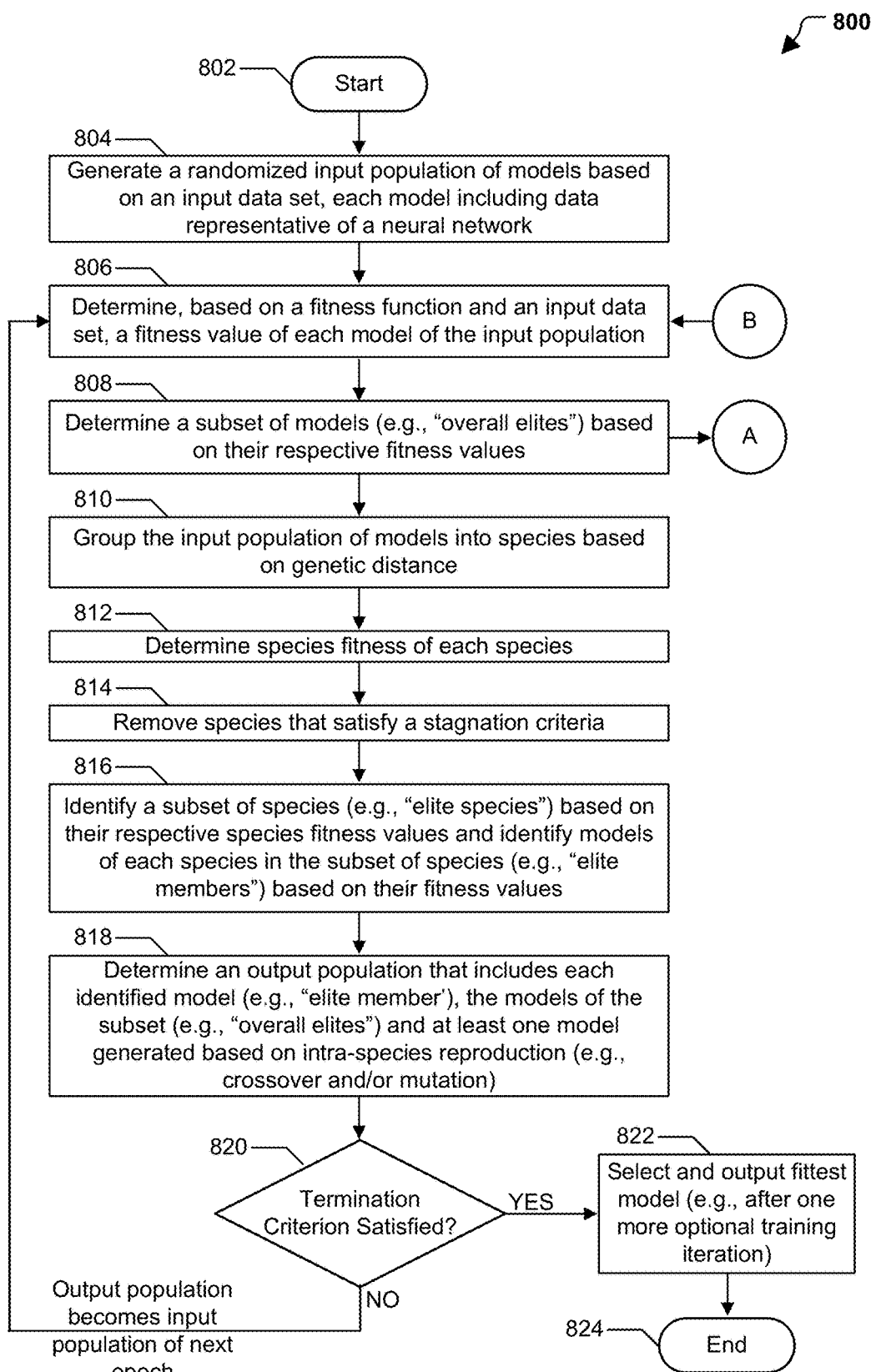
FIGS. 8A and 8B collectively illustrate a particular example of a method of cooperative execution of a genetic algorithm and a backpropagation trainer.
Figure 8B:
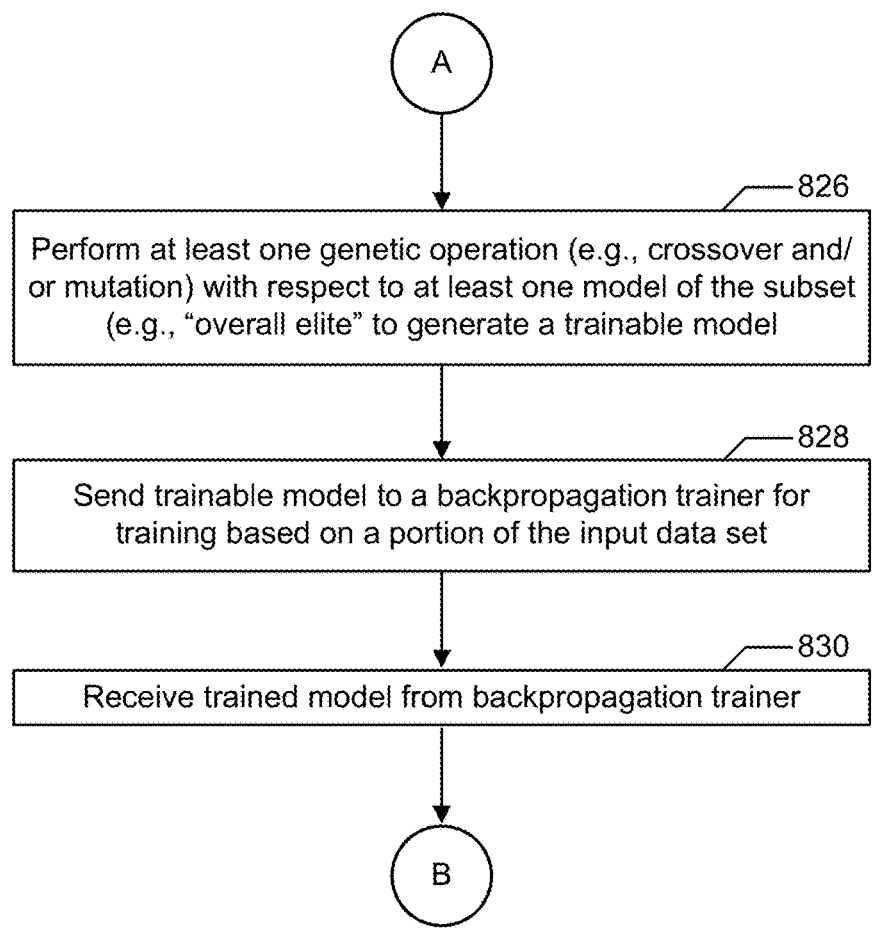

FIGS. 8A and 8B depict a particular example of a method 800 of cooperative execution of a genetic algorithm and a backpropagation trainer. In an illustrative example, the method 800 may be performed at the system 100 of FIG. 1.

The method 800 may start, at 802, and may include generating a randomized input population of models based on an input data set, at 804. Each model may include data representative of a neural network. For example, each model may include at least node data and connection data, as described with reference to FIGS. 1 and 2. Further, each of the models may be part of the input set 120 of FIG. 1 and may model the input data set 102 of FIG. 1.

The method 800 may also include determining, based on a fitness function, a fitness value of each model of the input population, at 806. For example, the fitness of each model of the input set 120 may be determined, as described with reference to FIGS. 1 and 3.

The method 800 may further include determining a subset of models based on their respective fitness values, at 808. The subset of models may be the fittest models of the input population, e.g., "overall elites." For example, "overall elites" may be determined as described with reference to FIGS. 1 and 4.

The method 800 may include performing multiple sets of operations at least partially concurrently. Continuing to 826 (in FIG. 8B), the method 800 may include performing at least one genetic operation with respect to at least one model of the subset to generate a trainable model. For example, the crossover operation 160 and/or the mutation operation 170 may be performed with respect to the "overall elites" to generate the trainable model 122, as described with reference to FIGS. 1, 4, and 5.

The method 800 may also include sending the trainable model to a backpropagation trainer (or other optimization trainer) for training based on a portion of the input data set, at 828. For example, the backpropagation trainer 180 of FIG. 1 may train the trainable model 122 based on a portion of the input data set 102 to generate the trained model 182, as described with reference to FIGS. 1 and 5.

The genetic algorithm may continue while backpropagation training occurs. For example, the method 800 may include grouping the input population of models into species based on genetic distance, at 810, and determining species fitness of each species, at 812. To illustrate, the models of the input set 120 may be grouped into species and species fitness may be evaluated as described with reference to FIGS. 1, 3, and 4.

Continuing to 814, species that satisfy a stagnation criteria may be removed. For example, species satisfying the stagnation criterion 150 may be removed, as described with reference to FIGS. 1 and 4. At 816, the method 800 may include identifying a subset of species based on their respective fitness values and identifying models of each species in the subset based on their respective model fitness values. The subset of species may be the fittest species of the input population, e.g., "elite species," and the identified models of the "elite species" may be the fittest members of those species, e.g., "elite members." For example, species fitness values, "elite species," and "elite members" may be determined as described with reference to FIGS. 1 and 4.

The method 800 may include determining an output population that includes each "elite member," the "overall elites," and at least one model that is generated based on intra-species reproduction, at 818. For example, the models of the output set 130 of FIG. 1 may be determined, where the output set 130 includes the overall elite models 460-464, the elite members (including the elite member model 470), and at least one model generated based on intra-species reproduction using the crossover operation 160 and/or the mutation operation 170, as described with reference to FIGS. 1 and 6.

The method 800 may include determining whether a termination criterion is satisfied, at 820. The termination criterion may include a time limit, a number of epochs, or a threshold fitness value of an overall fittest model, as illustrative non-limiting examples. If the termination criterion is not satisfied, the method 800 returns to 806 and a next epoch of the genetic algorithm is executed, where the output population determined at 818 is the input population of the next epoch.

As described above, while the genetic algorithm is ongoing, the backpropagation trainer may train the trainable model to generate a trained model. When training is complete, the method 800 may include receiving the trained model from the backpropagation trainer (or other optimization trainer), at 830 (in FIG. 8B). The trained model may be added to the input set of an epoch of the genetic algorithm, as shown in FIG. 8B.

When the termination criterion is satisfied, at 820, the method 800 may include selecting and outputting a fittest model, at 822, and the method 800 may end, at 824. In some implementations, the selected model may be subjected to a final training operation, e.g., by the backpropagation trainer or by another trainer, before being output.

It is to be understood that the division and ordering of steps in FIGS. 8A and 8B is for illustrative purposes only and is not be considered limiting. In alternative implementations, certain steps may be combined and other steps may be subdivided into multiple steps. Moreover, the ordering of steps may change. For example, the termination criterion may be evaluated after determining the "overall elites," at 808, rather than after determining the output population, at 818.

In conjunction with the described aspects, a computer system may include a memory configured to store an input data set and a plurality of data structures, each of the plurality of data structures including data representative of a neural network. The system also includes a processor configured to execute a recursive search. Executing the recursive search includes, during a first iteration: determining a fitness value for each of the plurality of data structures based on at least a subset of the input data set, selecting a subset of data structures from the plurality of data structures based on the fitness values of the subset of data structures, performing at least one of a crossover operation or a mutation operation with respect to at least one data structure of the subset to generate a trainable data structure, and providing the trainable data structure to an optimization trainer. The optimization trainer is configured to train the trainable data structure based on a portion of the input data set to generate a trained data structure and to provide the trained data structure as input to a second iteration of the recursive search that is subsequent to the first iteration.

In conjunction with the described aspects, a method includes, based on a fitness function, selecting, by a processor of a computing device, a subset of models from a plurality of models. The plurality of models is generated based on a genetic algorithm and corresponds to a first epoch of the genetic algorithm. Each of the plurality of models includes data representative of a neural network. The method also includes performing at least one genetic operation of the genetic algorithm with respect to at least one model of the subset to generate a trainable model and sending the trainable model to an optimization trainer. The method includes adding a trained model received from the optimization trainer as input to a second epoch of the genetic algorithm that is subsequent to the first epoch.

In conjunction with the described aspects, a computer-readable storage device stores instructions that, when executed, cause a computer to perform operations including, based on a fitness function, selecting a subset of models from a plurality of models. The plurality of models is generated based on a genetic algorithm and corresponds to a first epoch of the genetic algorithm. Each of the plurality of models includes data representative of a neural network. The operations also include performing at least one genetic operation of the genetic algorithm with respect to at least one model of the subset to generate a trainable model and sending the trainable model to a trainer. The operations include adding a trained model received from the trainer as input to a second epoch of the genetic algorithm that is subsequent to the first epoch.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system comprising:
   a memory configured to store an input data set and a plurality of data structures, each of the plurality of data structures including data representative of a neural network;
   a processor configured to execute a recursive search, wherein executing the recursive search comprises, during a first iteration:
      determining a fitness value for each of the plurality of data structures based on at least a subset of the input data set;
      selecting a subset of data structures from the plurality of data structures based on the fitness values of the subset of data structures;
      performing at least one of a crossover operation or a mutation operation with respect to at least one data structure of the subset to generate a trainable data structure; and
      providing the trainable data structure to an optimization trainer, the optimization trainer configured to:
         train the trainable data structure based on a portion of the input data set to generate a trained data structure; and
         provide the trained data structure as input to a second iteration of the recursive search that is subsequent to the first iteration.

2. The computer system of claim 1, wherein the optimization trainer is executed on a different device, graphics processing unit (GPU), processor, core, thread, or any combination thereof, than the recursive search.

3. A method comprising:
   based on a fitness function, selecting, by a processor of a computing device, a subset of models from a plurality of models, the plurality of models generated based on a genetic algorithm and corresponding to a first epoch of the genetic algorithm, wherein each of the plurality of models includes data representative of a neural network;
   performing at least one genetic operation of the genetic algorithm with respect to at least one model of the subset to generate a trainable model;
   sending the trainable model to an optimization trainer; and
   adding a trained model received from the optimization trainer as input to a second epoch of the genetic algorithm that is subsequent to the first epoch.

4. The method of claim 3, wherein the fitness function is evaluated based on an input data set associated with the genetic algorithm.

5. The method of claim 3, wherein the optimization trainer is configured to use a portion of an input data set associated with the genetic algorithm to train the trainable model.

6. The method of claim 3, wherein the data representative of the neural network includes node data corresponding to a plurality of nodes of the neural network.

7. The method of claim 6, wherein the node data includes an activation function, an aggregation function, a bias, or any combination thereof.

8. The method of claim 3, wherein the data representative of the neural network includes connection data corresponding to one or more connections of the neural network.

9. The method of claim 8, wherein the connection data includes node pairs, connection weights, or any combination thereof.

10. The method of claim 3, wherein the optimization trainer is configured to update connection weights of the trainable model but not a topology or activation functions of the trainable model.

11. The method of claim 3, wherein the first epoch is an initial epoch of the genetic algorithm.

12. The method of claim 3, wherein the first epoch is a non-initial epoch of the genetic algorithm.

13. The method of claim 3, wherein the second epoch and the first epoch are separated by at least one epoch.

14. The method of claim 3, wherein the at least one genetic operation includes crossover, mutation, or a combination thereof.

15. The method of claim 3, wherein each of the plurality of models includes at least one output node configured to generate an output value corresponding to a field of an input data set associated with the genetic algorithm and wherein a fitness value of a particular model is based at least partially on a comparison of the output value and the field of the input data set.

16. The method of claim 3, wherein each of the plurality of models includes at least one output node configured to generate a classifier result.

17. The method of claim 3, wherein the plurality of models corresponds to an input population of the first epoch, and further comprising:
grouping the models of the plurality of models into species based on genetic distance between the models;
determining a species fitness value of each of the species;
selectively removing one or more species from the genetic algorithm responsive to determining that the one or more species satisfy a stagnation criterion;
determining one or more elite species based on their respective species fitness values;
identifying elite members of each elite species; and
generating an output population to be input into the second epoch, wherein the output population includes each of the elite members and at least one model generated based on intra-species reproduction.

18. The method of claim 17, wherein the output population further includes the trained model received from the optimization trainer.

19. A non-transitory computer-readable storage device storing instructions that, when executed, cause a computer to perform operations comprising:
based on a fitness function, selecting a subset of models from a plurality of models, the plurality of models generated based on a genetic algorithm and corresponding to a first epoch of the genetic algorithm, wherein each of the plurality of models includes data representative of a neural network;
performing at least one genetic operation of the genetic algorithm with respect to at least one model of the subset to generate a trainable model;
sending the trainable model to a trainer; and
adding a trained model received from the trainer as input to a second epoch of the genetic algorithm that is subsequent to the first epoch.

20. The non-transitory computer-readable storage device of claim 19, wherein the trainer comprises a backpropagation trainer and wherein the operations further comprise:
grouping the models of the plurality of models into species based on genetic distance between the models;
determining a species fitness value of each of the species;
selectively removing one or more species from the genetic algorithm responsive to determining that the one or more species satisfy a stagnation criterion;
determining one or more elite species based on their respective species fitness values;
identifying elite members of each elite species; and
generating an output population to be input into the second epoch, wherein the output population includes each of the elite members and at least one model generated based on intra-species reproduction.

* * * * *